(12) United States Patent　　　　(10) Patent No.: US 12,619,689 B1

Brownlee　　　　　　　　　　　　　　(45) Date of Patent: May 5, 2026

(54) DATA WATERMARKING

(71) Applicant: KMG Labs, Dubai (AE)

(72) Inventor: Johnathan William Brownlee, Tucson, AZ (US)

(73) Assignee: Kamanga Labs, Dubai (AE)

( * ) Notice: Subject to any disclaimer, the term of this patent is extended or adjusted under 35 U.S.C. 154(b) by 48 days.

(21) Appl. No.: 18/888,173

(22) Filed: Sep. 18, 2024

Related U.S. Application Data

(60) Provisional application No. 63/539,091, filed on Sep. 18, 2023.

(51) Int. Cl.
　　*G06F 21/16*　　　(2013.01)
　　*G06T 1/00*　　　(2006.01)
(52) U.S. Cl.
　　CPC ............ *G06F 21/16* (2013.01); *G06T 1/0064* (2013.01)

(58) Field of Classification Search
　　None
　　See application file for complete search history.

(56) References Cited

U.S. PATENT DOCUMENTS

2008/0157780 A1 *　7/2008　Beeman ............... G01R 31/083
　　　　　　　　　　　　　　　　　　　324/529

* cited by examiner

*Primary Examiner* — Cai Y Chen
(74) *Attorney, Agent, or Firm* — Johnathan W. Brownlee

(57)　　　　　　　　ABSTRACT

Systems and methods for tracking and monitoring the distribution, and consumption of data regardless of format are robust, durable, and can include both human and machine-readable hidden mark data. These extrinsic yet invisible identifiers are tamper resistant and tamper evident, allowing for origin and integrity of valuable data to be ensured. A content management and distributed content distribution network including distributed ledger technology is enabled by smart watermarking using wave synthesis techniques that can survive massive marking data loss or attack.

20 Claims, 4 Drawing Sheets

*75% QIM bit loss*

*80% image loss*

*85% lossy JPEG*

*Original*

*Marked Image*

*Recovered Mark Data*

DATA WATERMARKING

CROSS-REFERENCE TO RELATED APPLICATIONS

This application claims the benefit of U.S. provisional patent application Ser. 63/539,091 filed Sep. 18, 2023. The entire contents of the identified priority document are hereby incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

TECHNICAL FIELD

The present invention relates to digital watermarking of data, in particular the marking and tracking of digital data that resists manipulation or removal.

BACKGROUND OF THE INVENTION

Unless otherwise indicated herein, the materials described in this section are not prior art to the claims in this application and are not admitted to be prior art by inclusion in this section.

Digital data is an increasingly valuable and defined object of property, rising above a simple commodity; copyrighted works such as motion pictures, music recordings, printed word, photos and art, timely market data for trading stocks or bonds, algorithms, source code, and news articles from around the world are all valuable data. In many cases, the value of the data is intrinsic and related to where it comes from, such as the authorship of a report, timeliness of a stock price in a particular market, or a genuine licensed copy of a creative work like an album, video performance, book, or song. Who and where valuable data is attributed to strongly determines the potential value of that data, as well as determining that the data was acquired through bona-fide means from its owner or licensee.

Digital watermarking systems are one way that electronically represented data can be embedded with a durable code that is not necessarily perceptible to the user but can be detected through a predetermined detection process. In these systems, an encoder adds a pre-determined watermarking signal to a host media signal represented by the data. One common example of a digital watermark is a hidden logo or signal added into a host data stream like an image or sound file so the digital watermark can be later recovered as evidence of where that particular host data originated. Although images, music and video data are commonly watermarked all structured data ca be watermarked with sufficiently flexible schemes; watermarking is simply injecting one signal (the mark) into a second signal (the host data to be marked) in such a way as to make it unobvious when the host data is being consumed in its usual idiom. Plain text, for example, can be watermarked by using word-choice and frequency schemes to provide a host signal that can encode the marking signal.

Watermarking is differenced from the related topics of steganography and encryption. Steganography seeks to make detecting the hidden signal undetectable by all parties but an intended recipient, where encryption seeks to make the valuable host data simply unusable without the use of a key to decrypt and render usable the host data. Simply comparing the mark data retrieved from host data that bears a mark with the original mark measures the authenticity and degree of any adulteration the marked data may have seen in transit.

Finally, with the advent of generative artificial intelligence (AI) and related phenomena such as deep-fakes and generative text, there is a need to mark content that may be used to train diffusion or adversarial content generators. Examples of such generative adversarial network AI ("GAN AI") services include Stable Diffusion, DALL-E/CLIP, Google's Bard, ChatGPT, and its meta-learning-based platform models such as GPT-3 and GPT-4, and Midjourney. A watermarking technique where the majority of the marking signal could be destroyed or replaced, and yet the mark is still discernably recovered, is of great interest in tracking the input and output to GAN AI models and the content mixed into the digital zeitgeist.

There is therefore a need for systems and methods for marking data so that it can later be attributed to a source or point of release and tracked by efficient and effective watermarking.

SUMMARY OF THE INVENTION

The present invention is a general-purpose watermarking technique using digital holography to generate and embed mark data within the signal(s) of host data via a marking signal generated from the mark data and embedded in the host data itself. The host data is thus altered in order to embed the computer-generated digital hologram of the mark data so that a reading component can analyze the host signal to detect whether a mark is present, and if so to extract and identify that mark. Holography is used because of several properties known in the art of holograms, such as holograms' resistance to digital manipulation, signal loss, rescaling/transcoding, cropping, occlusion, compression and compressed dynamic range; a small part of a hologram represented in a few bits of dynamic range can reconstruct a mark with a high correlation to its originally injected form. Although both amplitude and phase terms are available to embed as mark data into the host data, the phase component of the digital hologram (a 'kinoform') can have particular resistance to GAN AI-related processing of the host data for later generated content.

Watermarking systems generally consist of a pair of complimentary processes: one for creating and embedding the mark data into the host data to be tracked, and another to detect the mark data from a copy of the host data at a later time. This happens once the system has confirmed the suspected marking signal matched what would be expected, after which it then extracts and validates the mark embedded within the host data. Although a mark can be a visible image or logo, digital mark data can also itself be a quantity of digital data that when read or executed by a machine produces some additional result. As examples, mark data could thus be program or machine code for execution, a digital fingerprint from some other process relating to the intrinsic properties of the host data, or an element of an encryption system like a key or digital signature. These marks can therefore be used in many different useful applications, such as anti-counterfeiting, authentication of digital or physical origin for the host data, as identity or security data to validate the authorship or publisher relationship for the host data, or as a time-stamp validating the timeliness of the host data above and beyond its own innate time-related metadata. A key property of marked data is that applications that might operate on the marked host data need not be specially programmed or prepared to handle that marked data differently than unmarked data; a video or audio player will play the same movie or song whether the data is marked or not.

A mark is input as a matrix to a computer-generated holographic (CGH) method, such as a Fresnel approximation discrete CGH represented by a two-dimensional ("2D") discrete Fourier transform (dFT). It is used to generate the CGH, and then an inverse 2D dFT, to reconstruct the CGH into the original mark after extraction. Holographic parameters used in the construction and reconstruction are used in the CGH generation, and then known a priori at the recovery of the mark, functioning as a sort of 'key' to recover the original mark. The dFT CGH techniques are used to compute the amplitude and phase of a resultant hologram generated by a matrix of mark data as is known in the art.

Both the amplitude and phase of the resultant CGH can be embedded within the host data, though in some applications only the quantized phase of the resultant CGH (a kinoform) is embedded in the host data for marking. In many applications, only a few bits of quantized phase data from the CGH are required in this method to recover the mark from the marked host data, even when that host data is highly modified. Several different encoding methods can be used to embed the mark CGH data into the host data, such as least-significant bit, quantization index modulation ("QIM"), or rational-dither modulation ("RDM".) Encoding the watermark as a quantized phase representation of the CGH provides excellent resistance to traditional watermarking attacks, and the reconstructed data is highly correlated with the original mark data. What losses do occur in holographic reconstruction they can be compensated for with error correction codes such as CRC, Reed-Solomon or Hamming codes among others.

Armed now with a robust and tamper resistant way to encode mark data in any host data of interest, we can extend the management of mark data to include several examples of systems where marked host data is tracked by its attribution, authorship, origin, or other intrinsic property. Finally, we apply this holographic watermarking system in a volumetric multiplexed fashion to provide resistant watermarking of streaming host data, such as streaming audio or video, where segments of that stream might themselves be individually characterized and marked based on an earlier fingerprinting step that measures the host data's intrinsic characteristics. In these and other embodiments, the data watermarking is used to track authenticity, origin, attribution, and other useful qualities of the host data without requiring modification of systems or methods that might use the marked data that is unaware of the mark it carries.

DETAILED DESCRIPTION OF THE DRAWINGS

This document provides a number of ways to digitally watermark host data using a provided mark data, as well as some systems where that mark data is used to further other data watermarking or control schemes. Although many illustrations within this disclosure highlight the phase component of a digital hologram as a potential carrier for the mark data, using similar Fourier techniques, the same teachings could be used to include some or all of the amplitude components of the computer-generated hologram or other representation of the mark data. Moreover, there are examples of these data marking techniques that might be carried out using physically-realized holograms recorded in appropriate media and used in concert with digital data. These applications are completely within the intent and disclosure of this document and imagined within the inventions described below.

Briefly, a method of encoding extrinsic watermarking data within a particular piece of host data is described that uses computer generated holography to both embed the mark data as well as render it resistant to modification or removal by attackers or accident. The mark data is combined, with some holographic parameters later used to retrieve that mark data, by the use of a computed holographic process. In many cases the phase of the resultant hologram is extracted, quantized, and encoded by various methods into the host data, thus resulting in a watermarked copy of the host data. Armed with the holographic parameters, a marked host data file can have its mark recovered, often after modification or transformation into a different size or format, or after the loss of data in transit. An optional error correction step can be applied so the recovered mark data can be used as machine code or machine-readable data as desired in other data management functions.

Figures 1A, 1B:
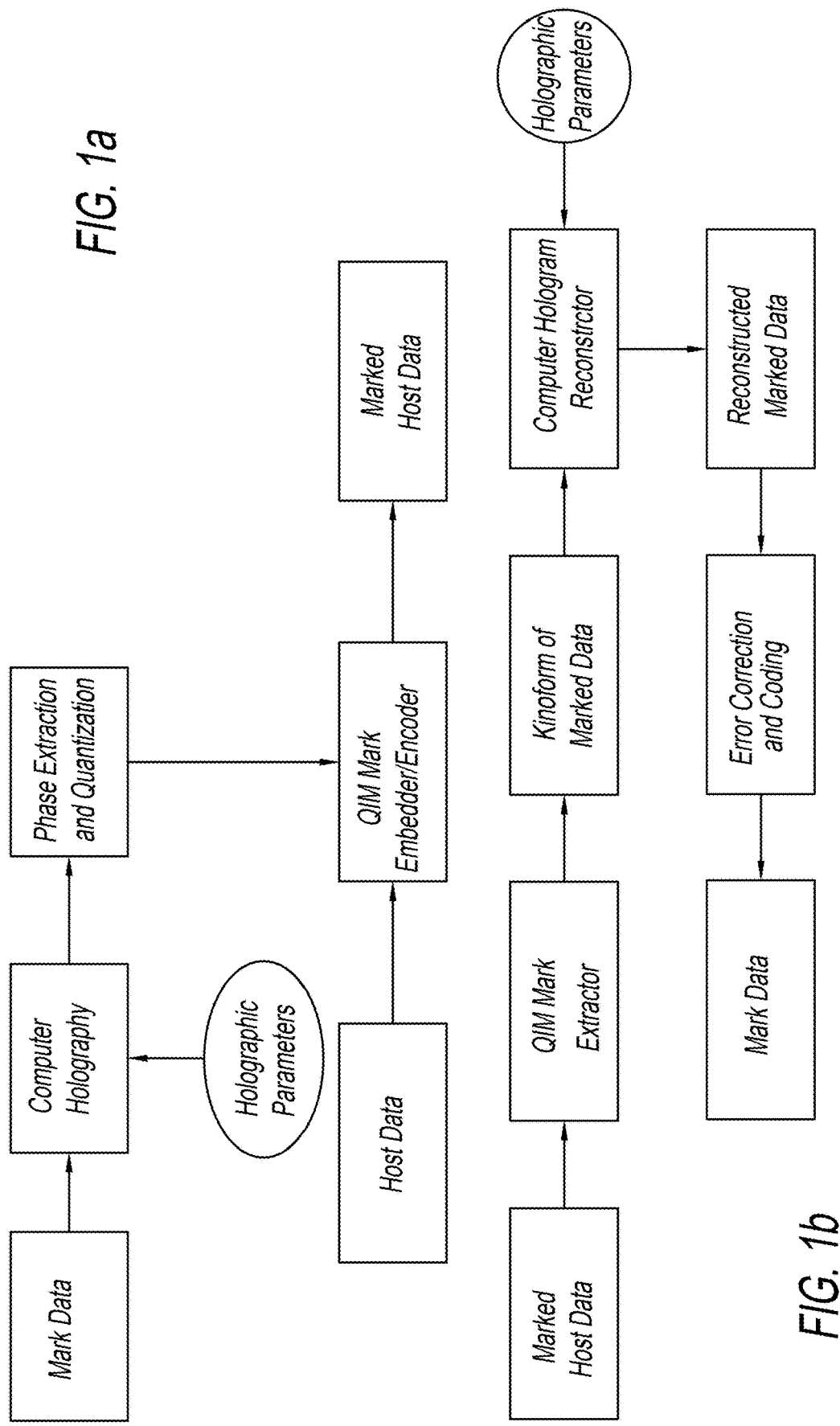
FIG. 1a illustrates the general scheme of marking host data, and recovering mark data from marked host data, using a digital holographic technique.
FIG. 1b illustrates a general scheme for recovering the mark data by extracting and reconstructing the holographic representation of the mark data.

In further detail, referring to the invention of FIG. 1, a general illustration of the method of marking data and retrieving marks is provided. Mark data, which will be embedded in the host data and carry the identifying or functional properties desired in the watermarking scheme, is provided by the user. Mark data can come in many different forms and can be as simple as a string of bits, a complex multidimensional array, or even a further layer of marking data. In other practices, the mark data might itself be machine code, or source or object code that can be compiled and/or executed at a later time after the mark data is recovered from the host data. Where mark data could include intrinsic measures of the qualities of the host data, like a fingerprint would, the mark data itself is strictly extrinsic; it is chosen in an absence of the qualities or type of data the host represents. In some examples shown in this document, the mark data is represented as a 2D array of bits forming a bitmap image of a geometric pattern.

It is understood that one of ordinary skill would appreciate these to be nonlimiting examples meant to aid in teaching about the disclosures herein, and that the mark data itself may be arbitrarily sophisticated or formatted. Indeed, it is possible the mark data could approach the size of the host data in some circumstances depending on the need for watermarking the valuable host data. Also the generation of marking signal could be through methods unrelated to Fourier-based computer holography; neural networks and wavelet transforms have been used to generate mark data that would be efficacious in the durable marking techniques taught herein, such as those of Tavakoli, A., Honjani, Z. & Sajedi, H. "*Convolutional neural network-based image watermarking using discrete wavelet transform.*" (Int. J. Inf. Tecnol. 15, 2021-2029 (2023). https://doi.org/10.1007/s41870-023-01232-8.) Marking signals can be synthesized through a variety of combinations, each including at least one wave synthesis method. In this manner, the robustness of the mark data is ensured.

Computer generated holography ("CGH") has several properties that are beneficial to a watermarking process: a small piece of a hologram can be reconstructed to recover a discernable representation of the mark data, hologram phases are largely resistant to manipulation in direct space of the amplitude and scale of the host data, and a low bit-count of fidelity can generate a discernable mark data signal on replay. It can also be shown that computer holography can be performed efficiently on computers via a discretized Fourier transform.

For example, holograms can be numerically simulated within the discrete and frequency domain by computing the field at the "camera" plane in direct space using the Fourier approximation in free-space propagation. This simulates a Mach-Zehnder interferometer with a discrete detector plane:

$$h(k, l) = \frac{1}{j\lambda d}\exp\left(j\frac{2\pi}{\lambda}d\right)$$
$$\sum_{m=-M/2}^{M/2}\sum_{n=-N/2}^{N/2} U_0(m, n) \times \exp\left\{\frac{j\pi}{\lambda d}\left[(k\Delta\xi - m\Delta x)^2 + (l\Delta\eta - n\Delta y)^2\right]\right\}$$

Where $\lambda$ is the wavelength, d is the 'object distance' in the computed holographic configuration being modeled, M×N are the dimensions of the discretely sampled input mark, and $\Delta_\eta$ and $\Delta_\xi$ are the horizontal and vertical sampling period in frequency-space. Several of these terms combine in the above calculation of the hologram field as a scaling relation where:

$$\Delta x = \frac{\lambda d}{M\Delta\xi}, \Delta y = \frac{\lambda d}{N.\Delta\eta}.$$

$\Delta x$ and $\Delta y$ represents the sampling period in the image domain of the resultant CGH. Thus, on replay in discrete form, we find the reconstructed field at each point (m,n) in the reconstructed mark data. It can be found as:

$$U_0'(m, n) = \frac{j}{\lambda d}\exp\left(-j\frac{2\pi}{\lambda}d\right)$$
$$\sum_{k=-M/2}^{M/2}\sum_{l=-N/2}^{N/2} h(k, l) \times \exp\left\{\frac{-j\pi}{\lambda d}\left[(m\Delta x - k\Delta\xi)^2 + (n\Delta y - l\Delta\eta)^2\right]\right\}$$

or essentially, a scaled discrete Fourier transform, where the scaling factors are represented herein as our 'holographic parameters' in the simplex case. $U_0(m,n)$ represents the phase of the object wave, and can be simulated by a random phase function. Alternatively, improved diffuser-based phase functions can be applied in the generation of the CGH such as the Gerchberg-Saxton diffuser. Note is taken that where the original work of Gerchberg & Saxton contemplated a 2D phase "mask," it is equally applicable to 1D and N-dimensional signals as an improved phase for CGH generation and replay.

It is imagined that CGH's representing multiplex holograms as volume holograms are also possible, though they will require sufficiently high quantization of their phase terms to represent the required M/# for multiplexing a discernable multiple exposure CGH within the host data. Peristrophic, wavelength (e.g., scaling-dependent,) and angular/phase multiplexing are all possible within the application of CGH to watermarking provided the encoding and embedding method represents an adequate number of phase quanta within the host data.

The resultant CGH representation of the mark data is now further processed to reduce the number of bits required to represent the hologram of the mark. One way to reduce this bit fidelity is to use only the phase term of the hologram, and to quantize the phase function into a small number of discrete layers. Again, holograms are highly tolerant to truncation and reduction in dynamic range on playback.

One way to additionally reduce the number of bits of precision required to represent the hologram is to quantize the remaining phase function into a small number of phase steps between 0 and $2\pi$. The number of bits used in embedding the hologram must be balanced against both the required fidelity of the reconstructed mark data, and the impact the embedding/encoding step will have on the host data. Several different types of mark embedding or encoding schemes are possible depending on the larger design of the watermarking scheme.

In FIG. 1, we specify a quantization modulation QIM-type mark embedding approach. It is noted that several other approaches to embedding and encoding the bits representing the holographic representation of the phase, amplitude, or both, of the mark data are also compatible with this method of watermarking. It is provable that the quantization index modulation methods are superior to Least-Significant Bit ("LSB")-based methods also common in steganography. However, LSB methods may be particularly suited to host data formats where the least significant bit values are simply the most convenient or the easiest to encode the mark data holography inside. Other encoding methods such as rational dithering are also applicable for embedding the quantized hologram into the host data, such as the quantized bits of our kinoform in one example described further below in discussing FIG. 2.

Here we note that where we detail a wave synthesis method through these examples that utilizes several forms of computational holography using Fourier methods, there is no limitation in the type of wave synthesis used to combine the marking parameters (holographic parameters in the following paragraph) with the mark data to generate a resilient marking signal that can be invisibly embedded within the host file. Wavelet transforms, Laplacian techniques, point-source lookup table computed holography and Fresnel transform methods are all useful depending on the type of host and marked host data to be embedded in the marked data output by these techniques. Indeed, as long as at least one wave synthesis function is used to generate the marking signal injected into the host data the resilience and durability of the extrinsic mark will remain; the retrieved mark data extracted and reconstructed from the marked host data will provide the sort of durability exhibited in FIG. 2 as well.

By way of nonlimiting example, one way the quantized bits of a kinoform representing the mark data could be embedded in a host data file would be to embed a kinoform of the mark data inside the low frequency coefficients of a wavelet-based compression algorithm. In QIM (Quantization Index Modulation) the mark data represented in the discrete bit levels of the resultant mark hologram are encoded by quantization of the host data. A series of non-intersecting but otherwise similar quantizing functions is used to 'hide' the mark data within the levels of quantization of the host data itself. In wavelet methods, including the discrete wavelet transform used in familiar video and photo formats such as JPEG, H.264, and MPEG, a final step in computing the discrete quantization of the wavelet coefficients requires this quantization of the host data into discrete levels. QIM encodes the mark data bits not in the host data, but in how the host data is discretized after packaging by an otherwise continuous set of functions. In simpler formats like bitmaps or TIFF, the least-significant bits of each pixel value could be similarly used to encode the mark bits, such as the bits of the quantized kinoform calculated earlier in our holographic computation. Additionally, since the QIM is being applied to a wavelet-based image format to begin with, it is also possible to combine wavelet-based holographic computation in the same wave synthesis pipeline as would be used to embed the marking signal for later recovery. A question remains as to how many of these mark bits need to be embedded to reconstruct the mark data correctly; that question is answered for at least 2 cases in our study of FIG. 2 below.

The embedding/encoding step takes the host data as an input, and embeds the bits of the mark hologram (e.g. a type of 'marking signal,') such as a quantized kinoform, into the host data generating a marked host data output. Although the mark data is recoverable from within the host data, unknowing or unsuspecting users of the mark data would not through normal use be able to detect the presence of the mark data by simply using the mark host data alone. On recovery and reconstruction, an interested party could however reconstruct the mark data and thus characterize the origin and attribution of the host data source.

Reconstruction and recovery of the mark data is largely the reverse of inserting it into the host data after rendering it into a digital hologram: The marked host data is passed through an extractor that detects and extracts the representation of the mark data, such as by analyzing the quantization scheme of the host data and recovering the kinoform of the mark data encoded within that QIM embedding scheme. The representation of the mark data, amplitude, phase, or both, is then used to reconstruct the hologram represented by the "hidden" mark data with the aid of the holographic parameters used during the generation of the mark hologram earlier. The reconstructed mark data is then output from the computer hologram reconstructor and may suffer from some artifacts depending on how modified or damaged the host data has become since the original marking process.

In some applications, the mark data might be used in a computer readable or machine executable fashion. If part or all the mark data may be machine code, source code, or object code, some error correction and coding repair may be required. For a simple 2D image mark, autocorrelation with the original mark may provide a figure of merit for the goodness of match for the existing watermark, and for the reconstructed one from the host data. Similar techniques can be used for time-sequential, spectral, and higher spatial order data types. For example, many content fingerprints are long 1D hexadecimal strings that have an expected structure and length; watermarks containing such structurally rigid types of mark data might be afforded additional sanity checking or lookups to validate proper reconstruction and recognition of the mark data in the host data.

Figure 2:
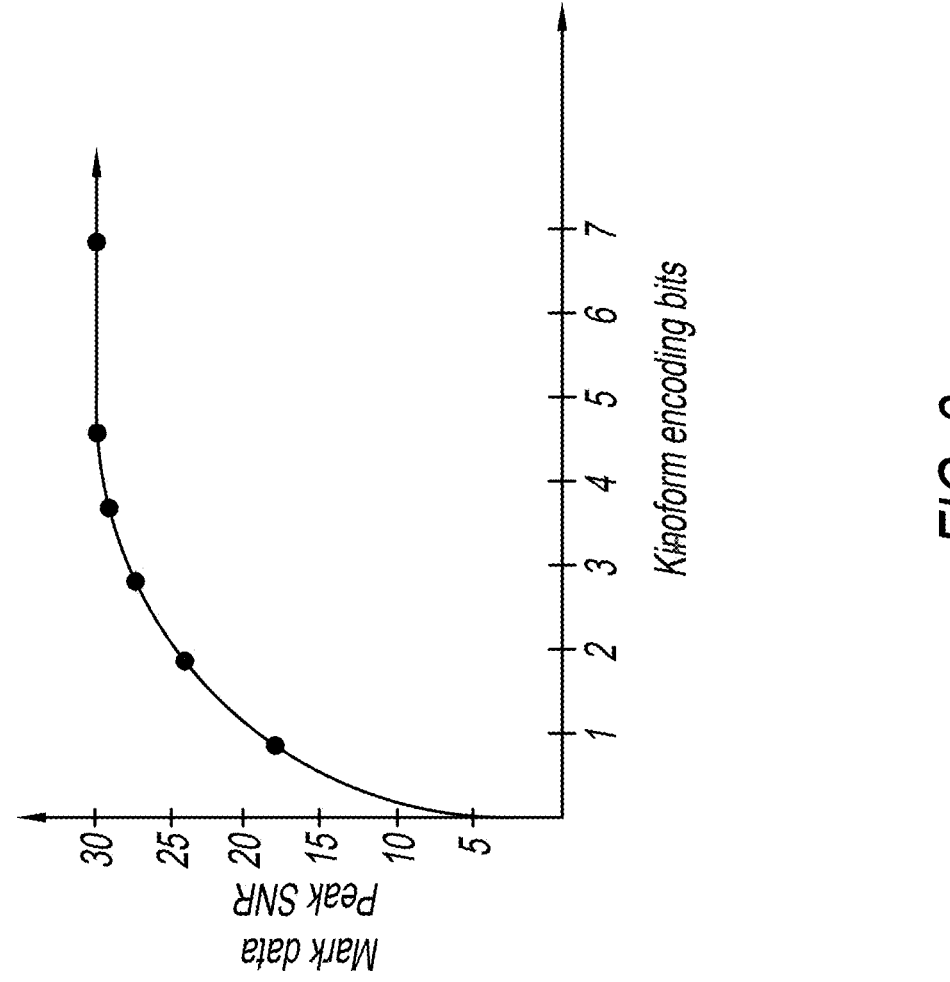
FIG. 2 is a plot of the peak Signal-to-Noise (SNR) for a reconstructed monochrome 2D watermark processed into a kinoform, and quantized to a given number of encoding bits representing the mark data.

Turning to FIG. 2, we find experimental results that aim to answer our question as to a range of quantization bits used above to embed the marking signal into the host data. This range is only computed after computing the relevant transformations and scalings to render the mark data more durable for later recovery. Here we create a toy-model of a 2D watermark using black and white geometric shapes and regions in a 128×128 matrix. This is also the example watermark data used in the later examples of FIG. 3 below.

The holographic parameters for wavelength sampling period in the image and frequency domain, and the effective recording and playback distance for the Fresnel domain, are constant in each reconstruction; that is, per above, the parameters for $\Delta x$ and $\Delta y$ are held the same for each trial. To simulate a quantized phase-only hologram signal as described in the concluding passages describing FIG. 1 above, the 'Phase Extraction and Quantization' step is run with a variable number of quantization bits allowed. Finally, each quantized phase-only hologram (kinoform) representing the mark data is reconstructed with a normalized input power, and the peak signal-to-noise (SNR) of the reconstructed 2D mark data 'image' is measured. Thus, it is shown how the amount of phase data stored in the image via QIM impacts the strength of the reconstructed mark data. A balance must be struck between how much QIM mark data is encoded in the host data, the observable quality change in the host data as more QIM mark bits are embedded, and the size of the resultant host file. In this we show the relative trade-offs between QIM bits and the expected SNR of the reconstructed mark.

Regardless of the phase-function used in the construction of a digital hologram, a certain non-zero SNR in a 2D image generated with these methods will result, even if it is the result of the diffuser or random phase of the object field computed in the CGH itself. This is the very low PSNR (Peak Signal-to-Noise) value seen in the zero-bit test case where the data is run through the pipeline, but no QIM encoding bits are actually injected into the host data. The trend of QIM bit resolution vs. the quality of the reconstructed mark data begins to evolve in the single bit case, with a pSNR of 18 on reconstruction. The peak SNR is measured as a ratio of image values and is hence dimensionless. As the number of bits allocated to represent the phase of the kinoform increases from 2-3 we see the maximum return on the bits of phase quantized in the mark data encoded in the host data. At $2^4$ levels of quantization an asymptote is reached, and additional bits of QIM representation of the phase data for the mark yield no further improvement in the strength of the reconstructed mark data. This result is valuable; with only 2-4 bits of phase representation in a kinoform of the mark data, a robust and resilient watermarking method is achieved leveraging the qualities of a hologram beneficial to watermarking.

Figure 3:
FIG. 3 is an illustration of reconstructed watermarks and their correlation with the original mark data after a marked image host is altered or destroyed.
Figure 3:
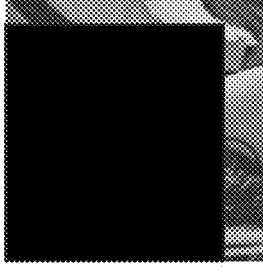
Figure 3:
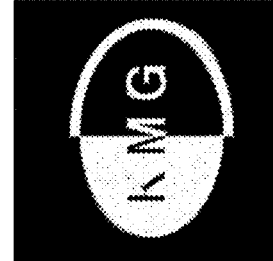
Figure 3:
Figure 3:
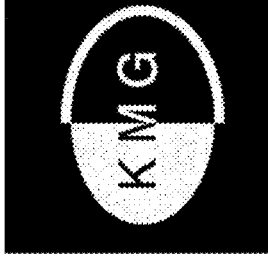
Figure 3:
Figure 3:

Turning to FIG. 3, we illustrate some of the beneficial properties of a phase-encoded representation of mark data within the host data receiving a watermark in one method outlined in this document. Although the first three examples have a high autocorrelation relationship (over 0.85) with the original input mark image, all the marks are largely identifiable as being present by a human inspector. Furthermore, the specificity required in the holographic parameters used in attempting to detect, extract and reconstruct the mark data from host data under evaluation makes accidental reconstruction of such a holographic watermark unlikely. Although not highly obfuscated, the scaling parameters described above in our discussion of the CGH watermarking process in FIG. 1 provide some resistance to brute force replay attacks on detecting watermarking under steganalysis.

In the original case, the mark data is embedded in a 1024×1024 standard 'Lena' image. The mark data is represented as a binary bitmap 128×128 bits in size, processed and embedded in the Lena image. This is described above for the kinoform method of a wavelet-based image format (here the well-known dWT (discrete wavelet transform)-based JPEG-2000.) In this example, the four lowest frequency coefficients are used as an example of how QIM can be applied to any common wavelet transform-based system. The left-most case represents the reconstruction of the mark data from the marked image with no attempt made to modify or damage the mark.

In the next case to the right (center-left,) the original watermarked Lena image is subjected to a 95% lossy JPEG compression recoding. Despite this lossy encoding, the QIM encoding combined with the minimum number of bits required to reconstruct the kinoform allow for a good reconstruction of the mark data, resulting in a 0.86 correlation with the original mark data. Similarly, a 90% loss of pixel data altogether as shown in the third (center-right) example results in a redacted image that is not entirely identifiable as the Lena test image at all, yet the remaining encoded phase coefficients when replayed as a CGH can generate a recognizable representation of the mark data as shown in the original sample.

Finally in FIG. 3's rightmost example we seek to simulate an attack in which an assailant knows the nature and type of watermarking used in this particular image. The assailant purposefully occludes and recodes the JPEG image so the wavelet coefficients, removing 75% of the QIM bit-count for the whole image. This does have the effect of cropping the image visibly about the center of the frame, such that the modified image could not be mistaken for the original content. It also degrades the gray levels and sharpness of the original host image. Although autocorrelation here is well below 0.5, a human inspector can still identify that there is some mark here in the reconstruction—the mark data is not random. Given the specificity of the holographic parameters needed to reconstruct the mark data, some certainty that the Lena image is watermarked can be achieved. With the 4-bit QIM encoding scheme of our watermarking method, we have demonstrated resilience to attacks on both data loss and compression. We have thwarted a purposeful and knowing attacker trying to obfuscate the mark itself at the expense of host image appearance and quality. The techniques described above are shown to resist tampering and removal of the mark data. It should be noted that non-QIM embedding methods for the kinoform data would still receive the benefit of the intrinsic durability of the CGH process to a degree related to the attack method, and relative to the number of bits of quantization lost in the mark data for that embedding technique.

Although in this example we illustrate a simple 2D grayscale logo as the mark data, a powerful quality of the teachings herein is the ability to use many different types of mark data, including machine readable mark data. In a simple case, an image may contain more information than a simple picture, like a bar or QR-code that represents more complex data of interest to the consumer or owner of the host data. Mark data can also be machine-intelligible as its primary role, with human recognition being a secondary factor. For example, a mark may service as more than a traditional watermark and include executable programming or machine codes that can be run on a hardware device. Data structures like bitstreams, key value-pair tables, higher dimensional arrays and uniform locators of resources or their identities (e.g. URI's and URL's) could also be encoded as the mark data and later extracted. Coupled with some redundant bit content, error correction codes can also be used as part of the mark data reconstruction and extraction from the marked host data. Finally, there is no reason that mark data embedded into host data could not itself also contain marking signals, or mark data nested within another representation of mark data in recursion.

Also we give some attention to the nature of the comparison between the mark data originally used to generate a marking signal that is embedded in the marked host data, and the later retrieved mark data that it is compared with to gage authenticity and identity. One straight-forward approach to comparing mark data is to simple cross-correlate the retrieved data with the expected extrinsic mark that was embedded before distribution. Depending on the nature and structure of the mark data, however, other comparison techniques may be relied on to enable different applications such as spectral analysis of mark data (e.g. its spectrum) that represents a sound or time-sequential data stream as the mark data. Machine-readable mark data as described earlier might be subjected to simple bitwise comparison or operators, like XOR or AND, to quickly determine whether a likely fit exists. Finally, where hashes are usually used in fragile marking applications likeness hashes applied to the comparison of the retrieved mark data and the original mark data that was embedded earlier in the process can quickly determine the relative similarity of arbitrary data structures used as mark data.

Figure 4:
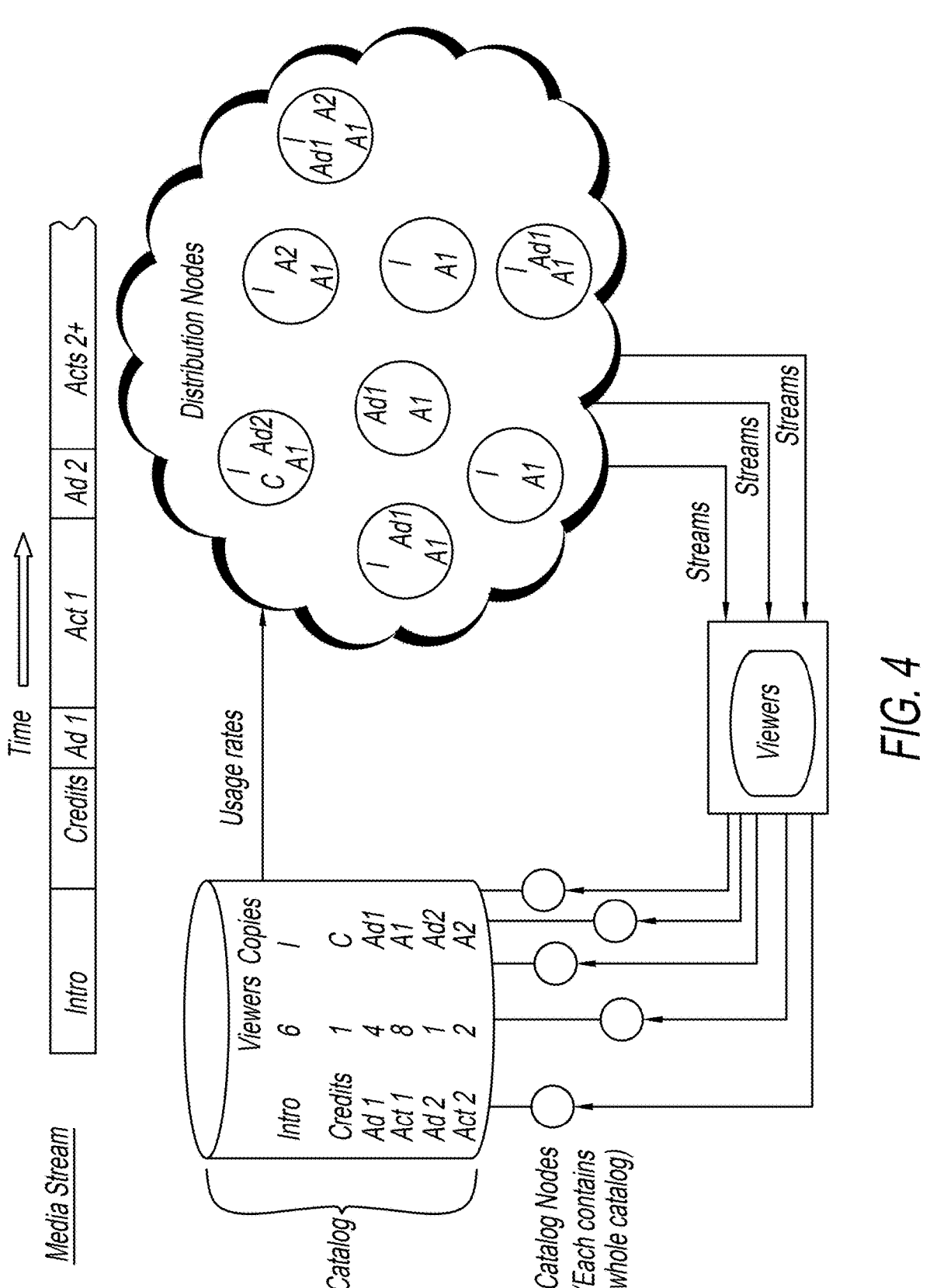
FIG. 4 is a diagram of a data discovery and distribution system for streaming data where the extrinsic mark data can be used with the intrinsic fingerprint to provide a complete discovery and tracking system without dependence on network or protocol monitoring.

FIG. 4 extends the extrinsic watermarking of data to incorporate other elements of a data management and tracking system. This could include a rights registry also containing watermarks alongside intrinsic characterizations of host data akin to a digital fingerprint. One such example of a right tracking and fingerprinting service that can manage watermarked data is the License Alchemy register of Kamanga.io, which stores multiple forms of content identification including intrinsic fingerprinting and user-defined mark data alongside other data useful in managing licensed or right-controlled data including digital content. Users of that marked data can then query the register and determine if the digital content they have received is legitimate, trustworthy, and unadulterated in transit.

Briefly, data fingerprinting uses techniques to measure the content of data in context of what it is likely to represent, such as a stream of financial market data, a sound file, video stream, or a series of printed news articles from a source of journalism. Applying a series of different algorithms and formulas, the digital data is analyzed for intrinsic properties like the textures and colors of an image, the harmonies, rhythms and timbre of a song, or the word choice and linguistic character of a written article. Fingerprints digest these intrinsic qualities to sum up what the "thing" the data represents is, like a minute of a movie or a black and white copy of a famous color photograph. Fingerprints are intrinsic to the host data, different yet complimentary to the marking data we embed in the previous discussions. A system armed with both has substantial advantages which we will now disclose.

Here we depict a media stream (top) that is being viewed by a user (a 'viewer,' bottom) as it queries a catalog service, or registry, to locate and validate the components that make up the desired viewing experience. Each component of the requested media stream (marked host data in this case,) and the order it's recommended to be assembled in and viewed, is stored in the catalog. Each component has a fingerprint of its intrinsic qualities, and a table of locations where the component can be found, as well as any extrinsic watermarks that are expected to be found within that component. For example, at the beginning of this media stream of a film there is first an introduction, then a credit sequence, then an advertisement, the first act of the film, another advertisement, and so on. Each piece of the media stream has an entry in the catalog. It also has a registry of its intrinsic fingerprints and extrinsic watermarks applied to that piece of content when it was enrolled in the catalog and distribution network (see right.)

The distribution network itself can be made up out of more than one source for the data of interest. In this example the components are strung together to make a media stream for the movie watching experience desired by one or more users. In this example, both Source 1 and Source 2 have their own copies of the components of the media stream, but each copy has its own mark in the catalog. Thus, Source 1 has a copy of the Intro that will look up as having a correct version of the fingerprint for the Intro. The fingerprints are based on the sights, sounds, and graphics that make up that section of the movie watching experience for viewer to enjoy. However, the copy of Intro on Source 1 has a different extrinsic watermark, Mark 1, applied to it. Similarly, the copy of Intro on Source 2 has a different extrinsic watermark, Mark 2. Although both copies would show as having the same fingerprint, and likely to be the same video content, they are marked differently. The user is thus able to determine that any copy of the piece of content making up their stream has the right qualities and is part of the correct video sequence that user is requesting. The viewer, and the Catalog service the viewer is in communication with, are also both able to tell by the watermarking which Source—Source 1 or Source 2—is delivering that particular copy of the section to that viewer at that time in response to their request to view that protected content data.

The Viewers experience, shown in a time-sequential strip above the Viewer at lower center, is a string of fingerprints that validate that the content of the video data is consistent with that of the catalog entry, and of the expected quality on arrival. Moreover, because of the presence of extrinsic watermarks applied differently to each copy of the content, the viewer and the Catalog Service are also highly confident which of many Sources in the Distribution Network ultimately provided that copy of the content to the viewer. This determination, and the potential audit and tracking at the Catalog Service, is independent of the networking, transport or protocol layer of the Internet model. Proxies, additional unaffiliated CDN's, carrier network configurations and traffic management devices cannot tamper with the monitoring of the intrinsic data quality by fingerprint (that the video is the right one, has the proper sound and is of the right formatting). It also can't tamper with the ability to identify the intrinsic data via the catalog of copied watermarks, and can't block the ability to identify which Source was ultimately used to service that particular Viewer at that moment in time. In the case of the Kamanga.io content catalog the registry of rights, license information, and a complete picture of the distribution of valuable data are fused together to ensure valuable data is provided and monetized according to the wishes of its owners.

Although a centralized catalog service is possible, the flexible architecture of this catalog service lends itself well to distributed computing systems of cooperative peer nodes. Indeed, the catalog nodes and distribution nodes could be linked through distributed ledger technology (e.g. a blockchain data structure) allowing for a robust and censorship-resistant system to manage and distribute host data with transparent accountability and a measurable quality of service. As this extrinsic scheme of data marking and usage monitoring can be used with arbitrary host data formats, the systems and methods described are well-suited for content distribution networks that make audio, video, text, and interactive entertainment available while measuring the integrity of the data received by an end user through the comparison of mark data and the retrieved mark data extracted from the marked host data that was received by an end user.

While the foregoing written description of the invention enables one of ordinary skill to make and use what is considered presently to be the best mode of utility thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

I claim for Letters Patent:

1. A method of identifying data, the method comprising:
   a. generating a marking signal, the marking signal generated by combining marking parameters and mark data with at least one wave synthesis function;
   b. embedding a representation of the marking signal within host data to yield marked data;
   c. recovering at a later time a retrieved marking signal from the marked data;
   d. extracting, from the retrieved marking signal, retrieved mark data by applying an inverse of the at least one wave synthesis function, the at least one wave synthesis function provided the marking parameters; and
   e. comparing the retrieved mark data with the mark data used to generate the marking signal.

2. The method of claim 1 wherein the marking signal is a computer-generated hologram, and the marking parameters are holographic recording parameters.

3. The method of claim 1 wherein the at least one wave synthesis function is a discrete Fourier transform, and the inverse of the at least one wave synthesis function is an inverse discrete Fourier transform.

4. The method of claim 1 wherein embedding the representation of the marking signal includes at least one of a quantization index modulation of a component of the marking signal, least significant bit encoding, or an output of a neural network.

5. The method of claim 1 wherein recovering the retrieved marking signal includes reconstructing a computer-generated hologram using holographic parameters as the marking parameters.

6. The method of claim 1 wherein the mark data comprises: an image, an encryption key, a machine code, a bitstream, a table of key-value pairs, an executable program, an N-dimensional matrix, a uniform resource identifier, a uniform resource locator, a QR code, a barcode, second marking parameters, a second marked data, or a second marking signal.

7. The method of claim 1 where comparing the retrieved mark data with the mark data includes at least one of: computing a correlation of the retrieved mark data and the mark data, comparing a hash of the retrieved mark data and a hash of the mark data, evaluating a result of executing a machine code or executable program within the retrieved mark data, a bitwise comparison of the retrieved mark data and the mark data, or comparing a spectrum of the retrieved mark data with a spectrum of the mark data.

8. The method of claim 1 where generating a marking signal comprises generating a quantized kinoform of the mark data.

9. The method of claim 1 where comparing the retrieved mark data with the mark data includes computing a measure of a change between the mark data and the retrieved mark data.

10. A system for identifying data, the system comprising:
  a. a marking signal generator that combines marking parameters and mark data using at least one wave synthesis algorithm to generate a marking signal;
  b. an encoder that processes the marking signal into an embeddable marking signal that can me embedded in a type of host data;
  c. an embedder that adds the embeddable marking signal to the host data, outputting marked host data;
  d. an extractor that extracts the embeddable marking signal from the marked host data, outputting the embeddable marking signal;
  e. a decoder that reconstructs retrieved mark data from the embeddable marking signal using the marking parameters; and
  f. a comparer that processes the retrieved mark data and determines a difference between the mark data used to generate the marking signal and the retrieved mark data.

11. The system of claim 10 wherein the at least one wave synthesis algorithm the marking signal generator uses is one of a Fourier transform, a Laplace transform, a wavelet transform, an iterative Fresnel transform algorithm, a Feinup algorithm, or a Gerchberg-Saxon algorithm.

12. The system of claim 10 wherein the decoder also applies an error correction to the retrieved mark data.

13. The system of claim 10 wherein the comparer also compares a result of executing the retrieved mark data as machine code or an executable program.

14. The system of claim 10 wherein the mark data comprises: an image, an encryption key, a machine code, a bitstream, a table of key-value pairs, an executable program, an N-dimensional matrix, a uniform resource identifier, a uniform resource locator, a QR code, a barcode, second marking parameters, a second marked data, or a second marking signal.

15. A system for distributing host data comprising:
  a. a catalog, hosted on one or more catalog nodes, for tracking users requesting host data, the host data identified by a data identifying method including mark data, where the catalog records usage rates of the host data requested by the users;
  b. a data identification system that tracks in the catalog the host data the users are presently requesting by a comparison of mark data in the catalog with retrieved mark data determining a number of users requesting the host data; and
  c. distribution nodes that provide to the users the host data, where the number of distribution nodes providing the host data in the catalog is adjusted in response to the number of users requesting the host data determined by the comparison of mark data in the catalog with the retrieved mark data from the users.

16. The system of claim 15 where the data identification system uses mark data encoded into a marking signal that is embedded in the host data.

17. The system of claim 15 where the number of users are viewers of a media stream, and the host data is a part of the media stream.

18. The system of claim 15 where the comparison of mark data in the catalog and the retrieved mark data reported by the users are used to detect a degree of change in the host data received by the users from that stored in the distribution nodes.

19. The system of claim 15 wherein the distribution nodes comprise a content distribution network for music, video, text, or interactive entertainment data as the host data.

20. The system of claim 15 wherein the catalog and the catalog nodes further comprise a distributed ledger hosted by one or more of the catalog nodes.

* * * * *